(12) United States Patent
Poozhiyil et al.

(10) Patent No.: US 7,734,670 B2
(45) Date of Patent: Jun. 8, 2010

(54) ACTIONABLE EMAIL DOCUMENTS

(75) Inventors: Suraj T Poozhiyil, Seattle, WA (US);
Cyrus R Balsara, Sammamish, WA (US); Jason A Bould, Bellevue, WA (US); Mark H. Lucovsky, Montecito, CA (US); Richard Shawn McDowell, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 339 days.

(21) Appl. No.: 11/012,866

(22) Filed: Dec. 15, 2004

(65) Prior Publication Data

US 2006/0129592 A1 Jun. 15, 2006

(51) Int. Cl.
*G06F 17/30* (2006.01)
(52) U.S. Cl. ............... 707/999.102; 709/206; 715/225
(58) Field of Classification Search .................. None
See application file for complete search history.

(56) References Cited

U.S. PATENT DOCUMENTS

| | | | | |
|---|---|---|---|---|
| 6,253,231 B1 * | 6/2001 | Fujii | | 709/206 |
| 6,345,288 B1 * | 2/2002 | Reed et al. | | 709/201 |
| 6,405,225 B1 * | 6/2002 | Apfel et al. | | 715/210 |
| 6,704,024 B2 * | 3/2004 | Robotham et al. | | 345/581 |
| 6,941,304 B2 * | 9/2005 | Gainey et al. | | 707/10 |
| 6,954,934 B2 * | 10/2005 | Kumar | | 719/317 |
| 7,130,885 B2 * | 10/2006 | Chandra et al. | | 709/206 |
| 7,133,142 B2 * | 11/2006 | Matsuura et al. | | 358/1.13 |
| 7,158,986 B1 * | 1/2007 | Oliver et al. | | 707/102 |
| 7,178,099 B2 * | 2/2007 | Meyer et al. | | 715/513 |
| 2003/0163537 A1 * | 8/2003 | Rohall et al. | | 709/206 |
| 2003/0233419 A1 * | 12/2003 | Beringer | | 709/206 |
| 2005/0010799 A1 * | 1/2005 | Kelley et al. | | 713/200 |
| 2005/0080863 A1 * | 4/2005 | Daniell | | 709/206 |

OTHER PUBLICATIONS

"Email to data base script", Internet citation, Feb. 15, 1999, retrieved from the Internet at <<http://groups.google.com/group/comp.os.linux.help/browse_thread/9bef319b8460968f/4d6ce844dca6a233>> on Jul. 17, 2008, pp. 1-2.
EPO Communication Containing European Search Report, dated Jul. 29, 2008, from European Patent Application No. 05111374.4, pp. 1-7.
Guaraldi, et al., "Exchange Server 5.5 Secrets", IDG Books Worldwide, Inc., 1998, Chapter 36, pp. 819-833.

* cited by examiner

*Primary Examiner*—Don Wong
*Assistant Examiner*—Shyue Jiunn Hwa
(74) *Attorney, Agent, or Firm*—Lee & Hayes, PLLC

(57) ABSTRACT

A received reply email document enables some action to be effectuated using data included in the email document responsive to field identifiers associated with the data and corresponding to fields of metadata. The associated field identifiers that correspond to known fields of the metadata provide some expectation as to the semantic meaning and/or syntactic constraints of the data to which the field identifiers are associated. In a described implementation, an actionable email documents module creates an email document having blocks that are mapped to fields of metadata. The email document is transmitted to one or more recipients. Each recipient adds data to the blocks so that the data becomes mapped to the fields of the metadata. The recipients return a reply email document having the field-mapped data. Upon receipt, the module can effectuate some action using the field-mapped data responsive to the mappings.

22 Claims, 8 Drawing Sheets

ACTIONABLE EMAIL DOCUMENTS

TECHNICAL FIELD

This disclosure relates in general to email documents that facilitate effectuation of some action and in particular, by way of example but not limitation, to creating and using email documents having field tags that identify associated blocks and/or data.

BACKGROUND

A database may be considered an amalgamation of data that is arranged for ease and speed of search and retrieval. Each database may have one or more large structured sets of persistent data. They are usually associated with a program to enter, update, and query the data. An example of a simple database is a single file containing many records, each of which contains the same set of fields with each field being a certain fixed maximum width.

Databases are used by businesses, individuals, educational institutions, etc. to store data for subsequent accessing. Databases are often arranged and organized into fields so that accessing the data located therein is facilitated with respect to both searching and retrieval. However, prior to searching or retrieval, the data contained in a given database is previously stored in the database. Unfortunately, entering data into a database can require substantial infrastructure and is often time consuming.

For example, if one or a few people are responsible for entering data that is related to numerous individuals, the time consumed by physically entering the data by the few people can be enormous. Moreover, additional time is required because the one or few people first manually acquire the data from the numerous individuals. If, on the other hand, the numerous individuals are permitted to directly enter their own data into the database, wide-open access to the database is consequently granted to many people, which can require significant infrastructure.

Accordingly, there is a need for general schemes and/or techniques that can facilitate the acquisition of data from numerous individuals and/or the entering of such data into a database without requiring extensive infrastructure and/or without extensive manual entry by one or a few people who do have access to the database.

SUMMARY

A received reply email document enables some action to be effectuated using data included in the email document responsive to field identifiers associated with the data and corresponding to fields of metadata. The associated field identifiers that correspond to known fields of the metadata provide some expectation as to the semantic meaning and/or syntactic constraints of the data to which the field identifiers are associated. Consequently, at least one action may be effectuated responsive to this expectation.

In a described implementation, an actionable email documents module creates an email document having blocks that are mapped to fields of metadata. The email document is transmitted to one or more recipients. Each recipient is asked to fill in the blocks by adding appropriate data. This added data is thus mapped to the fields of the metadata. The recipients return a reply email document having the field-mapped data. Upon receipt, the actionable email documents module can effectuate some action using the field-mapped data responsive to the mappings. For example, if the metadata comprises a data source, the data of the reply email document may be inserted into the fields of the metadata to which the data is now mapped.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

Database designers have historically faced one seemingly-simple yet omni-present problem: getting data into their databases from the appropriate end-users. One option is to build a client application that provides rich views on the data. End-users can then interact with the database through the client application. These views have historically been provided by either a proprietary application or a web solution. In both cases, however, the solution creator faced similar problems: deployment of the solution and granting users access to the underlying database. Both problems present logistical and expense issues.

In a described implementation for actionable email documents, a data collection scenario for databases is facilitated by leveraging the fact that so many computer users have access to email. With an actionable email documents module, database users may create and send forms to specific recipients via email. When these mail recipients reply to the form that they have received, an automated process of the database user and form originator can parse through the email replies. This automated process can automatically insert relevant data included in the returned email into appropriate fields of the database. This described implementation for actionable email documents can thereby ameliorate deployment issues and/or issues with needing to grant end-users access to the database.

However, implementations with actionable email documents are not limited to database insertion situations or even database scenarios generally. Actionable email documents can be used in general to enable actions to be effectuated upon the receipt of a returned reply email document. In the following section entitled "ACTIONABLE EMAIL DOCUMENTS GENERALLY", effectuating general actions upon receipt of an email document is described with regard to a general actionable email documents module and metadata generally. In a subsequent section entitled "DATA INSERTION WITH ACTIONABLE EMAIL DOCUMENTS", a specific implementation in which data received in an email document is inserted into a database is described with regard to a bifurcated actionable email documents module and a database implementation of general metadata.

Actionable Email Documents Generally

Figure 1:
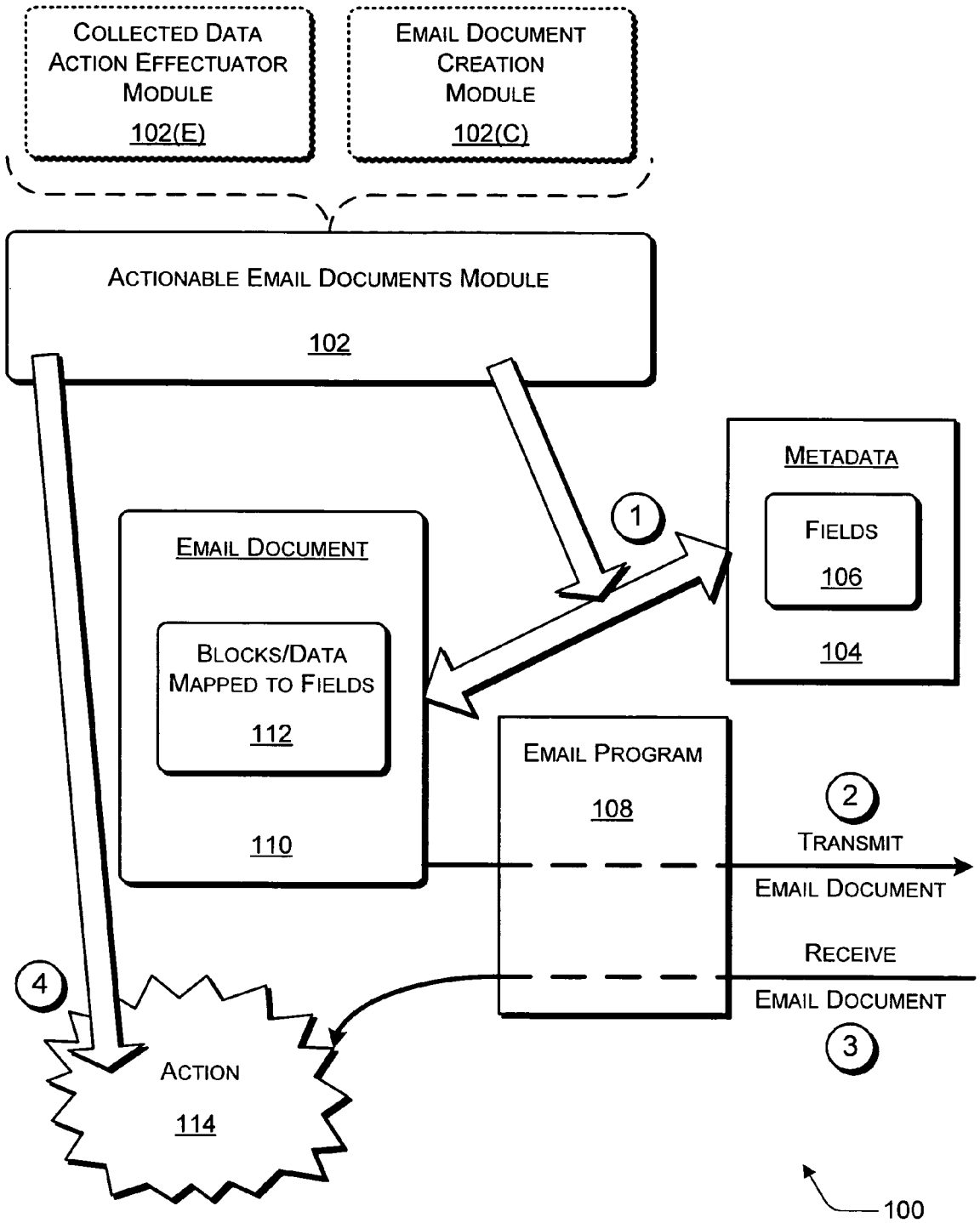
FIG. 1 is a block diagram of an example approach to actionable email documents.

FIG. 1 is a block diagram 100 of an example approach to actionable email documents. As illustrated, block diagram 100 includes an actionable email documents module 102, metadata 104, an email program 108, and an email document 110. Metadata 104 includes one or more fields 106, and email document 110 includes blocks and/or data that are mapped to fields 112. Metadata 104 is definitional data that provides information about or documentation of other data. The other data may be data that is managed within a specific application and/or a given environment.

Generally, examples of metadata 104 include a schema, a general data source (e.g., a database or portion thereof), workflow information, some combination thereof, and so forth. More specifically, metadata 104 might comprise, especially with respect to workflow information: expense reporting metadata; issue tracking metadata, which can include fields such as "Title Of Issue", "Description of Issue", "Issue Type", "Assigned To", etc.; asset tracking metadata, which can include fields such as "Asset Name", "Asset Type", "Date Acquired", etc.; document approval metadata, which can include fields such as "Document Name", "Document Author", "Status", "Approve By", etc.; and so forth.

In a described implementation, an actionable email documents module 102 operates in conjunction with metadata 104 and/or email program 108. When email document 110 is created, actionable email documents module 102 includes blocks that are mapped to fields 112 in which the mapping is to the known fields 106 of metadata 104. After data populates these blocks that are mapped to fields 112, some action based on this data can be effectuated responsive to the field mapping 112 of email document 110 because there is knowledge of fields 106 of metadata 104.

Four phases are illustrated in the example approach to actionable email documents of block diagram 100. At phase 1, email document 110 is created such that it includes blocks that are mapped to fields 112. These field-mapped blocks 112 are mapped to fields 106 of metadata 104. Fields 106 have expected (e.g., known) semantic meanings and/or syntactic constraints. At phase 2, email document 110 is transmitted using email program 108. Although not specifically illustrated in FIG. 1, field-mapped blocks 112 are populated with data by a recipient of email document 110, and these blocks become field-mapped data 112.

At phase 3, email document 110 is received using email program 108. This reply version of email document 110 includes field-mapped data 112. At phase 4, some action 114 is effectuated using field-mapped data 112 of the received reply email document 110. Action 114 may be effectuated because email document 110 may be parsed using the data field mappings 112 that are mapped to fields 106 of metadata 104.

Actionable email documents module 102 may be a standalone program, a plug-in of some type, a library component, some combination thereof, and so forth. Actionable email documents module 102 may be separate from or fully or partially integrated with email program 108 and/or metadata 104 (including a program providing access to metadata 104). Email program 108 may be an email client program, an email server program, another program type that includes email functionality, and so forth.

Actionable email documents module 102 may be comprised of a single (e.g., monolithic) piece of code or two or more severable pieces of code. In an optional implementation and as illustrated in block diagram 100 with dashed lines, actionable email documents module 102 may be comprised of two parts: an email document creation module 102(C) and a collected data action effectuator module 102(E). As is described further below with reference to FIGS. 3-7 and with regard to a database-specific implementation in which the effectuated action comprises data insertion, email document creation module 102(C) is involved with phases 1 and 2, and collected data action effectuator module 102(E) is involved with phases 3 and 4.

Figure 2:
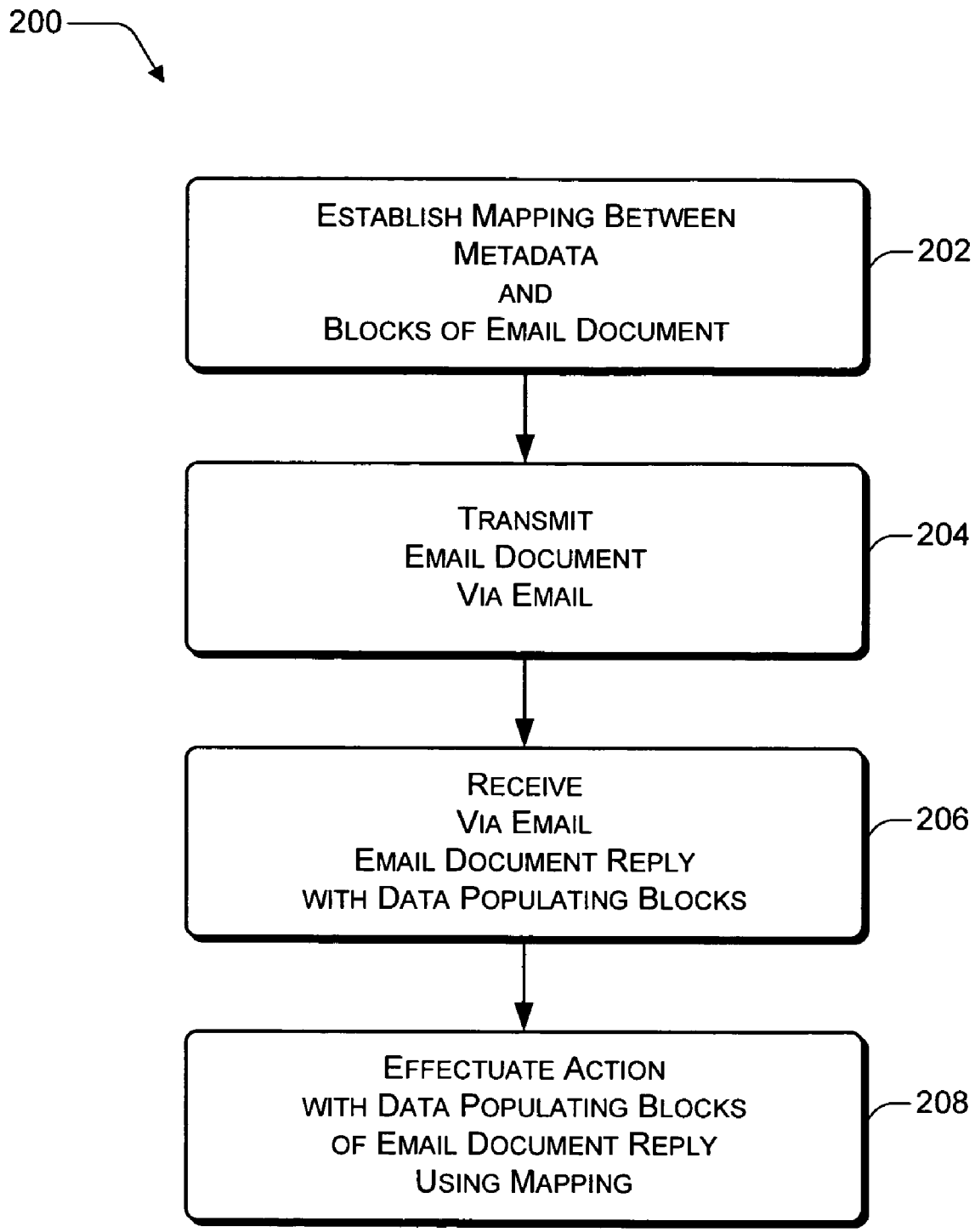
FIG. 2 is a flow diagram that illustrates an example of a method for creating and utilizing an actionable email document.

FIG. 2 is a flow diagram 200 that illustrates an example of a method for creating and utilizing an actionable email document. Flow diagram 200 includes four (4) blocks 202-208. Although the actions of flow diagram 200 may be performed in other environments and with a variety of hardware and software combinations, FIG. 1 is used in particular to illustrate certain aspects and examples of the method.

At block 202, a mapping between metadata and blocks of an email document is established. For example, a mapping between fields 106 of metadata 104 and field-mapped blocks 112 of email document 110 may be established. At block 204, the email document is transmitted via email mechanism(s). For example, email document 110 with field-mapped blocks 112 may be transmitted using email program 108.

At block 206, an email document reply with data populating the mapped blocks is received via email mechanism(s). For example, a reply email document 110 with field-mapped data 112 may be received using email program 108. At block 208, an action is effectuated with the data that populates the blocks of the email document reply using the mapping to the metadata. For example, an action 114 may be effectuated with field-mapped data 112 of the reply email document 110 because of the mapping to fields 106 of metadata 104.

These actions 114 may be any one or more of many possible actions. Examples of such actions 114 include: inserting data into a data source such as a database, forwarding the data in another email document, adding the data to a spreadsheet, launching a web service to produce a product with the data, managing workflows (e.g., workflows related to expense reporting, issue tracking, asset tracking, document approval, etc.), some combination thereof, and so forth.

By way of example only, an email document 110 may be created having blocks 112 that are mapped to known payroll fields 106 of accounting metadata 104. When a reply email document 110 is returned with data 112 that are mapped to the known payroll fields 106, one or more actions may be launched. These actions may include processing a reimbursement for expenses indicated by the data 112. If multiple actions are being launched in this example, the reimbursement processing may be followed by a storing of reimbursement/payroll data 112 into a database.

Other example actions that may be taken as a result of receiving an email document 110 include: (1) Validating incoming field-mapped data 112 and "forwarding" the data to different people based on metadata 104. For instance, if an invoice is greater than $10,000, then it needs to be forwarded to the Vice President for approval; otherwise, it can be forwarded to the accounts department. (2) Uploading a spreadsheet document to a shared document library, so it can be viewed by multiple people in the accounts department.

Data Insertion with Actionable Email Documents

Figure 3:
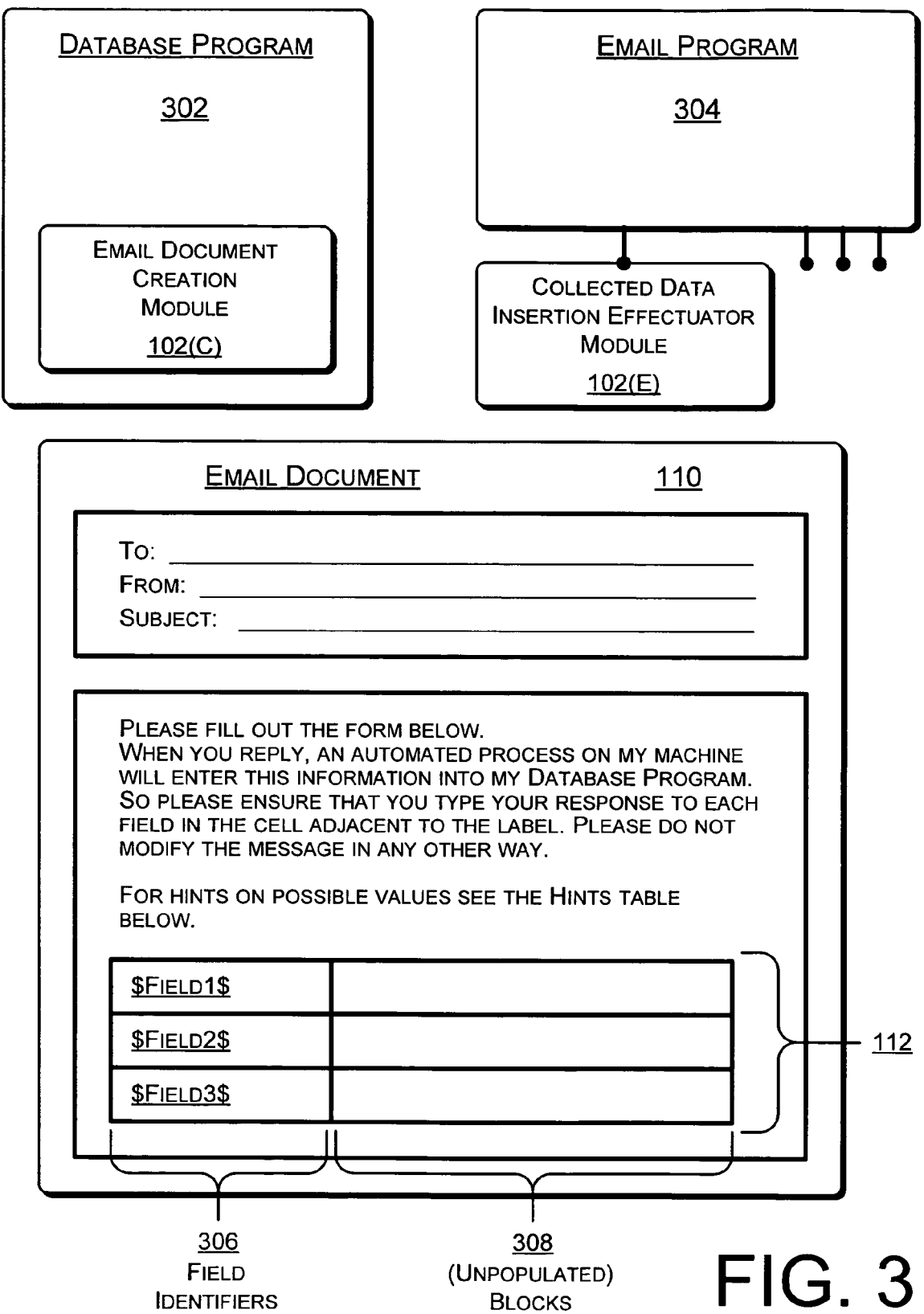
FIG. 3 is a block diagram example of a bifurcated actionable email documents module along with a created email document.

FIG. 3 is a block diagram example of a bifurcated actionable email documents module 102(C/E) along with a created email document 110. Bifurcated actionable email documents module 102 includes an email document creation module 102(C) and a collected data insertion effectuator module 102 (E). In a described implementation, email document creation module 102(C) is integrated with and constitutes part of database program 302, and collected data insertion effectuator module 102(E) interacts with email program 304. Email program 304 enables plug-in modules to interface with it, and collected data insertion effectuator module 102(E) comprises such a plug-in module. Email program 304 is a specific example of the general email program 108 (of FIG. 1).

Database program 302 allows a user to create multiple databases with each database having one or more tables. Access to a database and the tables thereof is provided by database program 302 using, for example, a query interface. When a user of database program 302 wants to collect data for a table, the user can select (e.g., with a menu, keyboard commands, etc.) an option to collect data by email while accessing the relevant table, through a query, and so forth.

Selecting the email data collection option launches a user interface mechanism that enables the user to selectively tailor the email document being created. The user interface may be, for example, a wizard, at least one dialog box, menus/tabs, typed commands, some combination thereof, and so forth. The user interface enables a user to select which fields of the database table are to be included in email document 110 in order to attempt to collect data for them from recipients of email document 110. The user is also enabled to select the recipients. After the user selects any options presented by the user interface, email document creation module 102(C) creates email document 110 with the selected options.

Email document 110 may include standard email routing and salutation information. This information may include, for example, a "To:" or recipient destination identification, a "From:" or origination identification, a "Subject:" line, and so forth. Email document 110 may also include introductory and explanatory text for the recipient. The text explains the purpose of the email and describes what is being requested of the recipient. A sample of such text is presented in the example body of email document 110 in FIG. 3.

As illustrated in FIG. 3, the example body of email document 110 also includes a data collection form having field-mapped blocks 112. Field-mapped blocks 112 include field identifiers 306 and blocks 308 that are currently unpopulated. Each respective field identifier 306 is associated with a respective block 308. Although only three such field identifier and associated block pairs are illustrated, more or fewer than three can alternatively be included in any email document 110.

Also, although blocks 308 are depicted literally as blocks in FIG. 3, they may be displayed in alternative manners. For example, blocks 308 may be displayed to a user/originator or to an email document recipient as a blank space, as an underlined area, as a highlighted area, and so forth. They may also be displayed differently to the email document recipient as compared to the user/originator. Thus, the term "blocks," as used herein with respect to blocks 308, is a logical and functional term that does not necessarily reflect the structure that is actually displayed.

Field identifier 306 can be comprised of any given identifying information, such as alphanumeric characters. However, human readability and understanding can be facilitated if the field identifier intrinsically indicates the corresponding field 106 of a database implementation example of metadata 104. Mappings between field identifiers 306 of email document 110 and fields 106 of a database implementation of metadata 104 is described further herein below with particular reference to FIGS. 4 and 6-7.

Implementations for actionable email documents may be realized in many alternative manners. For example, a database may have only a single table or may not even be organized by tables. Email document 110 may be realized in any format, including a public format such as hypertext markup language (HTML) or a proprietary format. By way of example only, if email document 110 is realized in an HTML format, each field identifier may comprise an HTML tag.

Also, additional selection options may be provided to the originating user. For example, the originating user may be asked to select from between or among the available email format options. Also, reply email processing options may be stipulated by the user. Examples include: (i) limiting to a selectable maximum a number of email replies to be processed, (ii) setting a deadline for arrival of email document replies in order to be eligible for processing, (iii) selecting whether email document replies are processed only if the origin thereof is recognized (e.g., was originally targeted as a recipient), (iv) choosing an order in which returned data or fields are to be processed, and so forth.

Additionally, as indicated by the sample text of email document 110 as illustrated in FIG. 3, hints can be included in the body of email document 110. A hints section indicates to a recipient the type of information desired for each unpopulated data block 308. The individual hints can indicate what data is desired, the expected format of the data (e.g., number and type of characters, decimal location, etc.), and so forth. The user may also determine the actual appearance of blocks 308.

Furthermore, email-based data collection for a database may be employed in both data addition and data update cases (as well as data deletion cases, too). In data addition cases, new data is being collected for fields that are currently empty in the database. In data update cases, current data is being verified and/or replaced with updated data. In such data update cases, the current data may be included in email document 110. If the current data is included, it may be presented in blocks 308 such that a recipient's inputting of updated data overwrites the "current" data in email document 110 and/or the reply thereof. Alternatively, the current data may be presented in an additional location of email document 110, such as another column.

Figure 4:
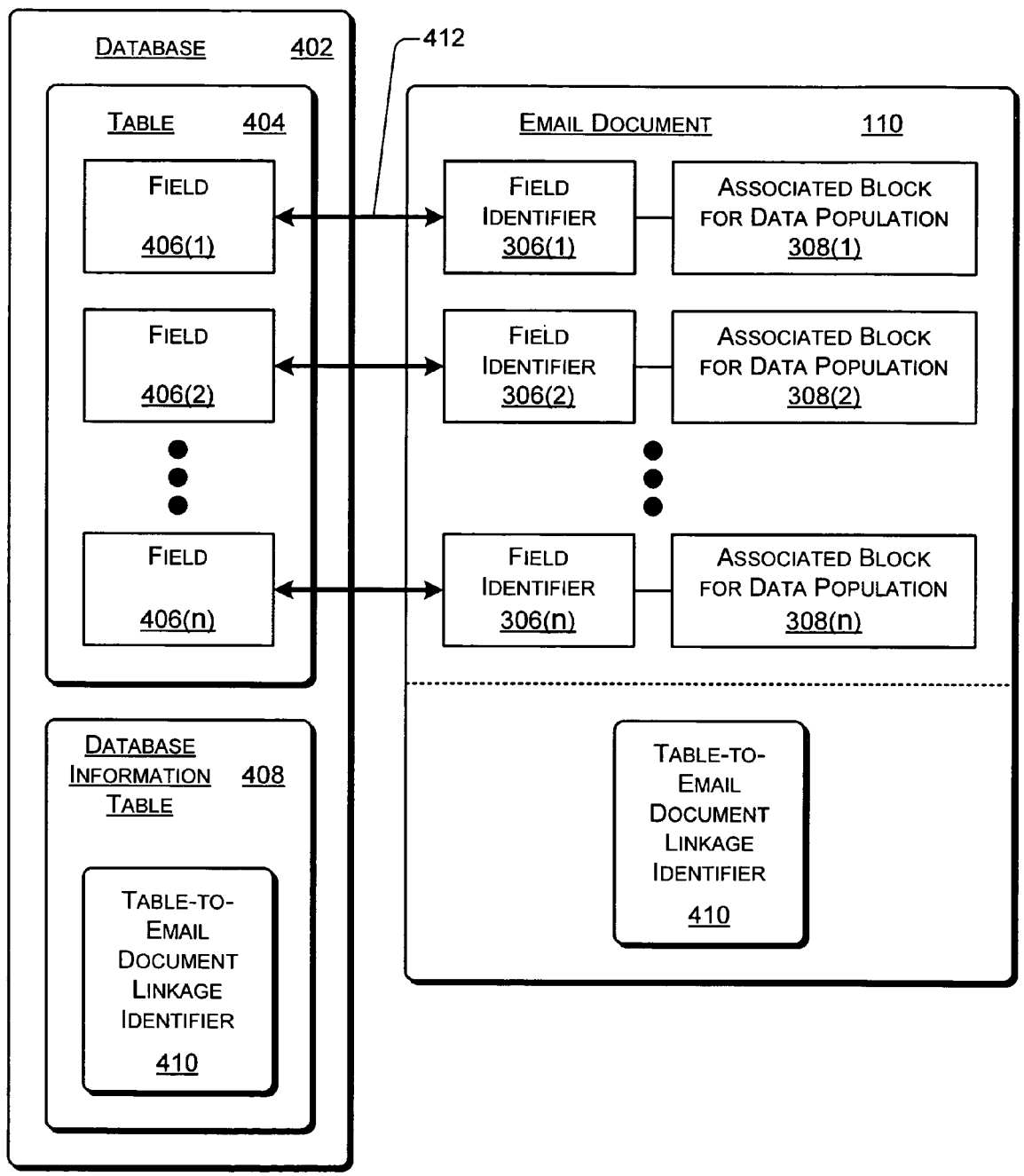
FIG. 4 is a block diagram example of a mapping between an email document and a database.

FIG. 4 is a block diagram example of a mapping 412 between email document 110 and a database 402. As illustrated, database 402 includes at least one data table 404 and a database information table 408. Database information table 408 includes information that facilitates access to tables of database 402 by database program 302 (of FIG. 3). Such information may be related to organization, identification, description, and so forth.

In a described implementation for actionable email documents, database information table 408 includes at least one table-to-email document linkage identifier 410. Table-to-email document linkage identifier 410 links (or maps) a table 404 of database 402 to an email document 110. At any given time, each table 404 of database 402 may have zero, one, two, or more corresponding table-to-email document linkage identifiers 410 located at database information table 408.

Table-to-email document linkage identifier 410 can be comprised of any given identifying information, such as alphanumeric characters. However, in a described implementation, table-to-email document linkage identifiers 410 are each comprised of a globally unique identifier (GUID).

Table 404 includes multiple fields 406. Table 404 and fields 406 are database-specific examples of general metadata 104 and general fields 106 (both of FIG. 1), respectively. As illustrated, table 404 includes a field 406(1), a field 406(2) . . . and a field 406(n). Table 404 may have any number of fields 406 with each such field 406 having separate, identical, related, unrelated, etc. syntactic constraints and semantic meanings in accordance with an intended purpose and/or definition of table 404. Each field 406 (although not necessarily all such fields 406) may be mapped 412 to email document 110.

Email document 110, as created by email document creation module 102(C) (of FIG. 3), includes multiple field identifiers 306 and associated blocks for data population 308. Email document 110 also includes a table-to-email document linkage identifier 410. As illustrated, email document 110 includes a field identifier 306(1), a field identifier 306(2) . . . and a field identifier 306(n) that are respectively associated with a block for data population 308(1), a block for data population 308(2) . . . and a block for data population 308(n).

Generally, each field identifier 306 of email document 110 is mapped 412 to a corresponding field 406 of table 404. As illustrated, field 406(1), field 406(2) . . . and field 406(n) are respectively mapped to field identifier 306(1), field identifier 306(2) . . . and field identifier 306(n). Thus, table-to-email document linkage identifier 410 links email document 110 to table 404 of database 402. Mappings 412, which are between fields 406 and field identifiers 306, link each block for data population 308 with a field 406 of table 404.

These mappings enable data populating blocks 308 in a reply email document 110 to be inserted into table 404 of database 402. Such mappings and data insertion are described further below with particular reference to FIGS. 6 and 7. An example of an overall process of creating and transmitting an email document, receiving a reply email document, and utilizing the received reply email document 110 for data insertion is described further below at a high level of abstraction with particular reference to FIG. 5.

Figure 5:
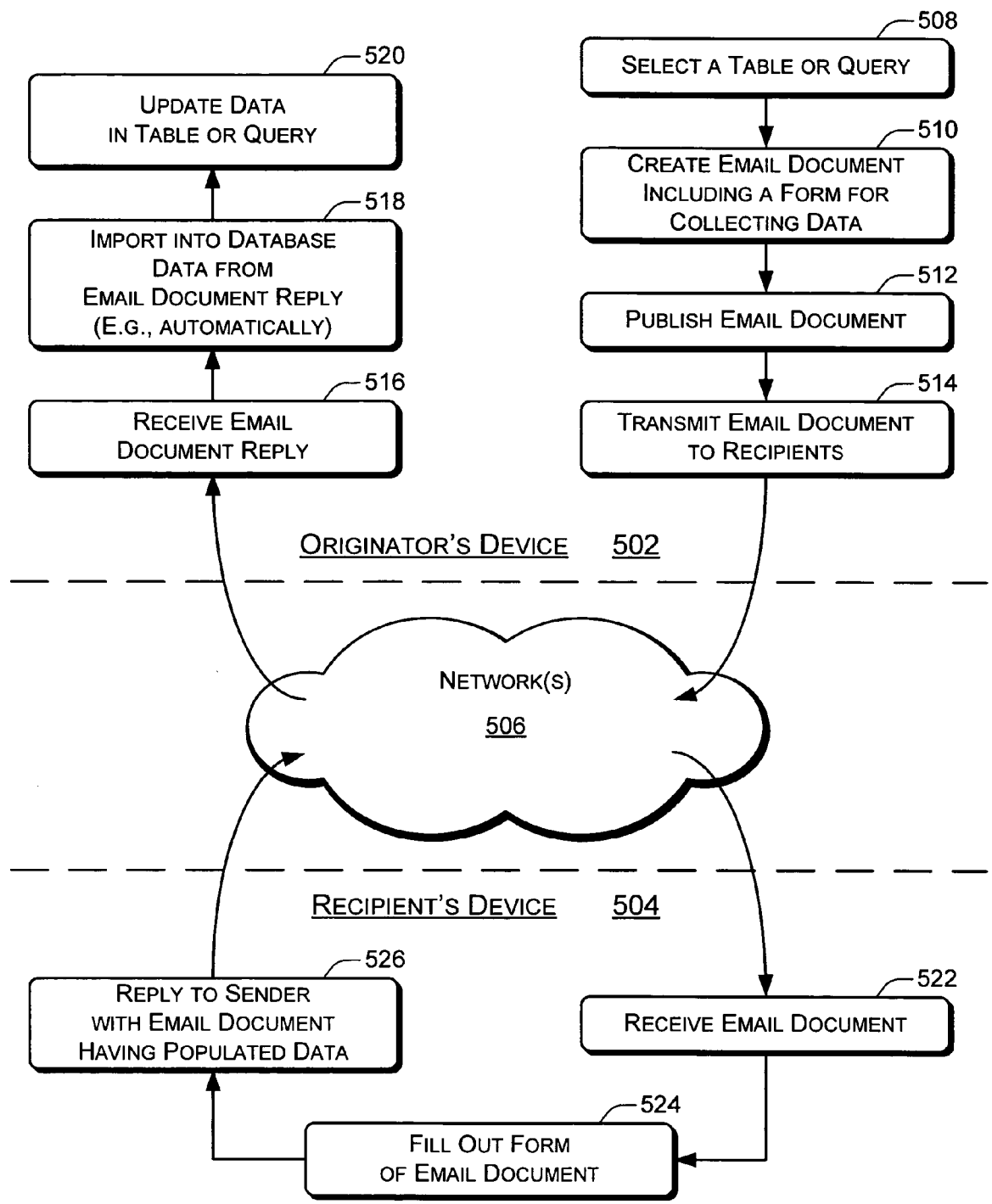
FIG. 5 is a high-level flow diagram that illustrates an example of creating and using an actionable email document at an originator's device and replying to the actionable email document at a recipient's device.

FIG. 5 is a high-level flow diagram 500 that illustrates an example of creating and using an actionable email document 110 at an originator's device 502 and replying to the actionable email document 110 at a recipient's device 504. Flow diagram 500 includes ten (10) blocks 508-526. The actions of seven (7) blocks 508-520 are performed at originator's device 502, and the actions of three (3) blocks 522-526 are performed at recipient's device 504. Although the actions of flow diagram 500 may be performed in other environments and with a variety of hardware and software combinations, FIGS. 1 and 3-4 are used in particular to illustrate certain aspects and examples of the method.

At block 508, a table or query is selected by the user/originator. For example, table 404 (or a query thereon) of database 402 may be selected. At block 510, an email document including a form for collecting data is created. For example, using email document creation module 102(C) (possibly in conjunction with email program 304), email document 110 that includes field-mapped blocks 112 may be created. Field-mapped blocks 112 include field identifiers 306 and associated respective blocks for data population 308. Respective field identifiers 306 correspond to respective fields 406 of table 404. The originator is empowered to select which fields 406 of table 404 are to be included in the data collection form of email document 110.

At block 512, the email document is published. For example, the originator may indicate that email document 110 is to be emailed by pressing a "Send" button or similar. At block 514, the email document is transmitted from the originator's device toward the device(s) of the recipient(s). For example, email program 304 may transmit email document 110 over network(s) 506 toward recipient's device 504. Network(s) 506 may be one or more networks, such as a private local area network (LAN), the Internet, a public-switched telephone network (PSTN), a wireless network, some combination thereof, and so forth.

At block 522, the email document is received at a recipient's device. For example, email document 110 may be received at recipient's device 504. At block 524, the recipient fills out the form of the received email document. For example, the recipient may enter appropriate data into field-mapped blocks 112 of received email document 110 to transform them into field-mapped data 112. More specifically, the recipient may enter data to be collected into blocks 308 to transform them into data 308 or data blocks 308. Respective data blocks 308 are associated with respective field identifiers 306.

Depending on the email client being used at recipient's device 504, the recipient may be able to enter data prior to activating a "Reply To" command or after activating it. In other words, it may be possible for the data being collected to be entered by the recipient in the received email document 110 or in the reply email document 110 that is to be transmitted back to originator's device 502. At block 526, the recipient replies to the sender with the email document having populated data. For example, recipient's device 504 may transmit reply email document 110 with blocks 308 being populated with data as field-mapped data 112 toward originator's device 502.

At block 516, the email document reply is received. For example, reply email document 110 with field-mapped data 112 may be received at originator's device 502 via email program 304. At block 518, data from the email document reply is imported into the database (e.g., automatically). For example, using collected data insertion effectuator module 102(E), data that now populates blocks 308 may be inserted into the appropriate table 404 of database 402 using mapping 412. Alternatively, the data may be manually imported from blocks 308 into database 402.

This mapping 412 entails table-to-email document linkage identifier 410 and respective field identifiers 306 that are associated with respective blocks with populated data 308. Respective data in blocks 308 that are associated with respective field identifiers 306 of reply email document 110 are inserted into corresponding respective fields 406 of table 404 of database 402. This mapping is described further below with particular reference to FIGS. 6 and 7. At block 520 of flow diagram 500, data in the table or query is updated. For example, collected data insertion effectuator module 102(E) and/or database program 302 can update table 404 or the original query.

Figure 6:
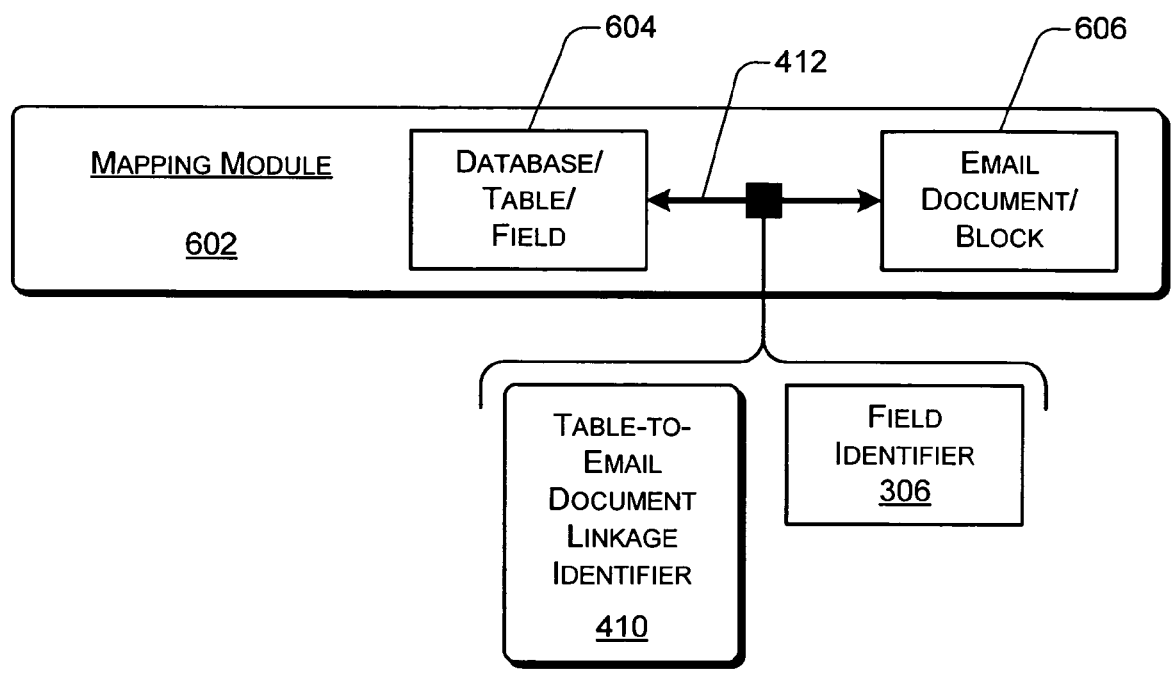
FIG. 6 illustrates an example of a general mapping scheme.

FIG. 6 illustrates an example of a general mapping scheme with a mapping module 602. Mapping module 602 is part of actionable email documents module 102. However, mapping module 602 may be distributed in any convenient or desirable manner. For example, mapping module 602 may be part of either or both of email document creation module 102(C) and collected data insertion effectuator module 102(E).

Generally, mapping module 602 ensures a mapping between each field 406 of a table 404 of a database 402 and each block 308 of an email document 110. In short, with implementations having multiple tables per database, mapping module 602 ensures a mapping between a database/table/field 604 and an email document/block 606. This mapping may be established in any manner, with one or more pieces of information, and with the information being distributed and located at any place.

However, in a described implementation, two pieces of information are used to establish this mapping: table-to-email document linkage identifier 410 and field identifier 306. Table-to-email document linkage identifier 410 serves to link or map each given email document 110 to a particular table 404 of a database 402. Within the particular table 404, respective fields 406 of the particular table 404 are mapped to respective blocks 308 of the given email document 110 with respective field identifiers 306. An example of this described mapping, including example distributive locations for the mapping information, is described further below with particular reference to FIG. 7.

Figure 7:
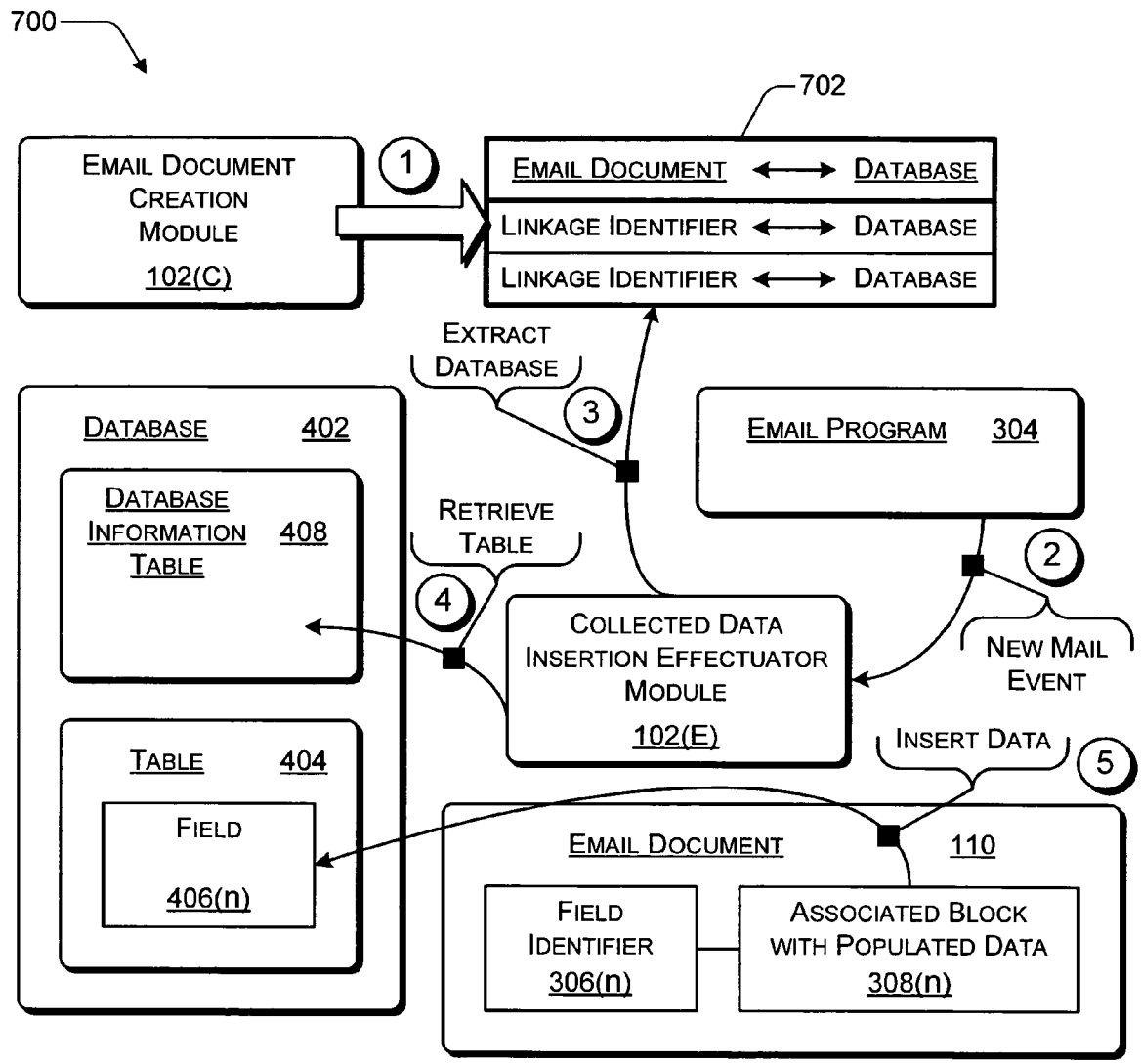
FIG. 7 illustrates an example of a specific mapping scheme with a bifurcated actionable email documents module.

FIG. 7 illustrates an example of a specific mapping scheme 700 with a bifurcated actionable email documents module 102(C/E). Mapping scheme 700 is described in terms of five phases. An email document 110 is created by email document creation module 102(C) as is described herein above. In mapping scheme 700 at phase 1, as part of the creation process, email document creation module 102(C) maintains a linkage table 702.

Linkage table 702 links email documents (110) to databases (402). Each entry of linkage table 702 links a given linkage identifier of a given email document 110 to a particular database 402. A linkage identifier corresponds to table-to-email document linkage identifier 410, which is included as part of email document 110 and database information table 408 as shown in FIG. 4. Linkage table 702 may be located anywhere. However, in a described implementation, linkage table 702 is stored as part of a configuration file (e.g., in an extensible markup language (XML) format) for email program 304.

At phase 2, a reply email document 110 has been received by email program 304. As a result, email program 304 provides a new mail event notification to its plug-ins, including collected data insertion effectuator module 102(E).

At phase 3, collected data insertion effectuator module 102(E) acquires table-to-email document linkage identifier 410 (if present) from the received email document 110. Collected data insertion effectuator module 102(E) compares the acquired table-to-email document linkage identifier 410 with each linkage identifier of linkage table 702. If a match is discovered, then it is apparent that the received reply email document 110 may include field-mapped data 112. The database 402 that is associated with the matching linkage identifier in linkage table 702 is therefore extracted.

In this described implementation, the particular database 402 is determinable from linkage table 702 but the particular table 404 is ascertainable from database information table 408. Although this separation is instituted for security reasons, the particular table 404 may alternatively also be discoverable from linkage table 702. If the data is to be manually imported, then the new mail event notification of phase 2 may merely result in the received reply email document 110 being marked as ready for manual import or similar after phase 3.

At phase 4, collected data insertion effectuator module 102(E) accesses the database information table 408 of the extracted database 402 that is associated with the discovered matching linkage identifier. From database information table 408, the actual particular table 404 for table-to-email document linkage identifier 410 of the reply email document 110 is retrieved. At this point, collected data insertion effectuator module 102(E) has ascertained the table 404 that maps to the received reply email document 110.

At phase 5, collected data insertion effectuator module 102(E) inserts data from blocks 308 of reply email document 110 into fields 406 of table 404. More specifically, using field identifiers 306 that correspond to fields 406, respective data that populates blocks 308 that are associated with respective identifiers 306 may be inserted into respective fields 406. As illustrated, field identifier 306(n) of reply email document 110 corresponds to field 406(n) of table 404. Data that populates block 308(n) is associated with field identifier 306(n). Hence, collected data insertion effectuator module 102(E) inserts the data that populates block 308(n) into field 406(n) of table 404 of database 402. The insertion may effectuate a data addition and/or a data update. Inserting "empty data" that populates blocks 308 is one technique for effectuating a data deletion. Alternatively, when "empty data" is received in blocks 308, a field and/or record can be actually removed to effectuate the data deletion.

Collected data insertion effectuator module 102(E), optionally in conjunction with other parts of database program 302, may validate data from data blocks 308 prior to insertion. The validation may include one or more syntactic checks to ensure that data 308 is appropriate for a field 406 in which it is to be inserted. If the validation check fails, an error message may be generated.

The devices, actions, aspects, features, phases, procedures, modules, components, etc. of FIGS. 1-7 are illustrated in diagrams that are divided into multiple blocks. However, the order, interconnections, interrelationships, layout, etc. in which FIGS. 1-7 are described and/or shown is not intended to be construed as a limitation, and any number of the blocks can be modified, combined, rearranged, augmented, omitted, etc. in any manner to implement one or more systems, methods, devices, procedures, media, apparatuses, arrangements, etc. for actionable email documents. Furthermore, although the description herein includes references to specific implementations (including a general device of FIG. 8), the illustrated and/or described implementations can be implemented in any suitable hardware, software, firmware, or combination thereof and using any suitable email document format(s), mapping scheme(s) or data structure(s), module distribution(s), identifier representation(s), action effectuation(s), metadata realization(s), and so forth.

Example Operating Environment for Computer or Other Device

Figure 8:
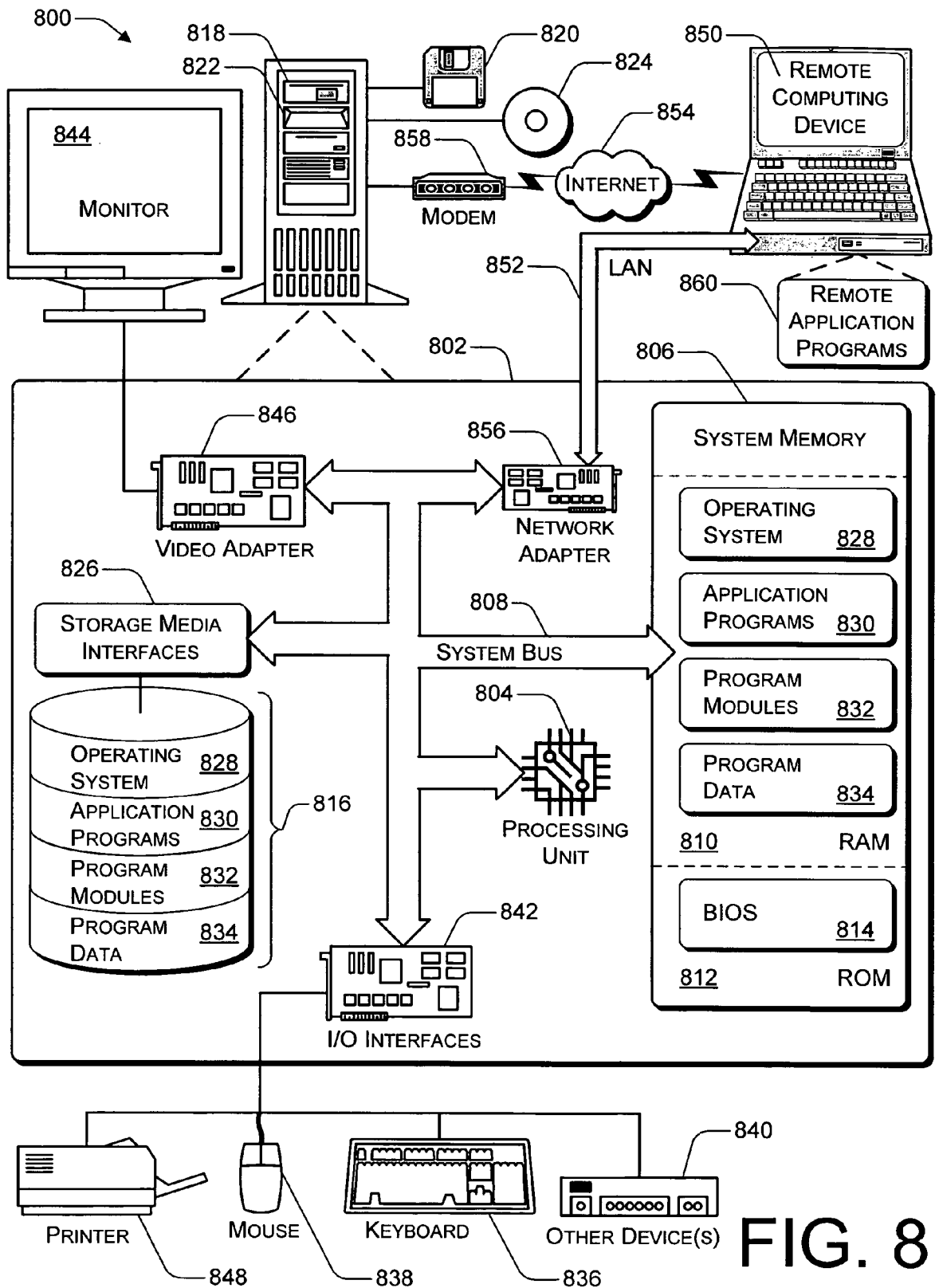
FIG. 8 illustrates an example of a computing (or general device) operating environment that is capable of (wholly or partially) implementing at least one aspect of actionable email documents as described herein.

FIG. 8 illustrates an example computing (or general device) operating environment 800 that is capable of (fully or partially) implementing at least one system, device, apparatus, component, arrangement, protocol, approach, method, procedure, media, API, some combination thereof, etc. for actionable email documents as described herein. Operating environment 800 may be utilized in the computer and network architectures described below.

Example operating environment 800 is only one example of an environment and is not intended to suggest any limitation as to the scope of use or functionality of the applicable device (including computer, network node, entertainment device, mobile appliance, general electronic device, etc.) architectures. Neither should operating environment 800 (or the devices thereof) be interpreted as having any dependency or requirement relating to any one or to any combination of components as illustrated in FIG. 8.

Additionally, actionable email documents may be implemented with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations for actionable email documents may be described in the general context of processor-executable instructions. Generally, processor-executable instructions include routines, programs, protocols, objects, interfaces, components, data structures, etc. that perform and/or enable particular tasks and/or implement particular abstract data types. Actionable email documents, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 800 includes a general-purpose computing device in the form of a computer 802, which may comprise any (e.g., electronic) device with computing/processing capabilities. The components of computer 802 may include, but are not limited to, one or more processors or processing units 804, a system memory 806, and a system bus 808 that couples various system components including processor 804 to system memory 806.

Processors 804 are not limited by the materials from which they are formed or the processing mechanisms employed therein. For example, processors 804 may be comprised of semiconductor(s) and/or transistors (e.g., electronic integrated circuits (ICs)). In such a context, processor-executable instructions may be electronically-executable instructions. Alternatively, the mechanisms of or for processors 804, and thus of or for computer 802, may include, but are not limited to, quantum computing, optical computing, mechanical computing (e.g., using nanotechnology), and so forth.

System bus 808 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 802 typically includes a variety of processor-accessible media. Such media may be any available media that is accessible by computer 802 or another (e.g., electronic) device, and it includes both volatile and non-volatile media, removable and non-removable media, and storage and transmission media.

System memory 806 includes processor-accessible storage media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is typically stored in ROM 812. RAM 810 typically contains data and/or program modules/instructions that are immediately accessible to and/or being presently operated on by processing unit 804.

Computer 802 may also include other removable/non-removable and/or volatile/non-volatile storage media. By way of example, FIG. 8 illustrates a hard disk drive or disk drive array 816 for reading from and writing to a (typically) non-removable, non-volatile magnetic media (not separately shown); a magnetic disk drive 818 for reading from and writing to a (typically) removable, non-volatile magnetic disk 820 (e.g., a "floppy disk"); and an optical disk drive 822 for reading from and/or writing to a (typically) removable, non-volatile optical disk 824 such as a CD, DVD, or other optical media. Hard disk drive 816, magnetic disk drive 818, and optical disk drive 822 are each connected to system bus 808 by one or more storage media interfaces 826. Alternatively, hard disk drive 816, magnetic disk drive 818, and optical disk drive 822 may be connected to system bus 808 by one or more other separate or combined interfaces (not shown).

The disk drives and their associated processor-accessible media provide non-volatile storage of processor-executable instructions, such as data structures, program modules, and other data for computer 802. Although example computer 802 illustrates a hard disk 816, a removable magnetic disk 820, and a removable optical disk 824, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 800.

Any number of program modules (or other units or sets of processor-executable instructions) may be stored on hard disk 816, magnetic disk 820, optical disk 824, ROM 812, and/or RAM 810, including by way of general example, an operating system 828, one or more application programs 830, other program modules 832, and program data 834. These processor-executable instructions may include, for example, one or more of an actionable email documents module, metadata (e.g., a data source such as a database or a table thereof), a database program, an email program, and so forth.

A user may enter commands and/or information into computer 802 via input devices such as a keyboard 836 and a pointing device 838 (e.g., a "mouse"). Other input devices 840 (not shown specifically) may include a microphone, joystick, game pad, satellite dish, serial port, video camera, scanner, and/or the like. These and other input devices are connected to processing unit 804 via input/output interfaces 842 that are coupled to system bus 808. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 844 or other type of display device may also be connected to system bus 808 via an interface, such as a video adapter 846. Video adapter 846 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 844, other output peripheral devices may include components such as speakers (not shown) and a printer 848, which may be connected to computer 802 via input/output interfaces 842.

Computer 802 may operate in a networked environment using logical connections to one or more remote computers, such as a remote computing device 850. By way of example, remote computing device 850 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 850 is illustrated as a portable computer that may include many or all of the elements and features described herein with respect to computer 802.

Logical connections between computer 802 and remote computer 850 are depicted as a local area network (LAN) 852 and a general wide area network (WAN) 854. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 802 is usually connected to LAN 852 via a network interface or adapter 856. When implemented in a WAN networking environment, computer 802 typically includes a modem 858 or other component for establishing communications over WAN 854. Modem 858, which may be internal or external to computer 802, may be connected to system bus 808 via input/output interfaces 842 or any other appropriate mechanism(s). It is to be appreciated that the illustrated network connections are examples and that other manners for establishing communication link(s) between computers 802 and 850 may be employed.

In a networked environment, such as that illustrated with operating environment 800, program modules or other instructions that are depicted relative to computer 802, or portions thereof, may be fully or partially stored in a remote media storage device. By way of example, remote application programs 860 reside on a memory component of remote computer 850 but may be usable or otherwise accessible via computer 802. Also, for purposes of illustration, application programs 830 and other processor-executable instructions such as operating system 828 are illustrated herein as discrete blocks, but it is recognized that such programs, components, and other instructions reside at various times in different storage components of computing device 802 (and/or remote computing device 850) and are executed by processor(s) 804 of computer 802 (and/or those of remote computing device 850).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. One or more processor-accessible storage media comprising processor-executable instructions that, when executed, cause a computing device to perform acts comprising:
   creating an email document by an actionable email documents module, the email document comprising a body, a data collection form, and a linkage identifier, the data collection form comprising at least one block for data population that is associated with a field identifier, the field identifier corresponding to a field of metadata, wherein the linkage identifier maps to the metadata, and the data collection form is in the body of the email document;
   setting one or more reply email processing options for reply email documents, wherein the one or more reply email processing options comprise a limit to a selectable maximum number of reply email documents eligible for processing;
   processing a reply email document that comprises the at least one block that is associated with the field identifier, the at least one block populated by data, the data entered by a recipient of the email document into the data collection form; and
   effectuating an action using the data populating the block of the reply email document and responsive to both the field identifier and the linkage identifier, wherein the action comprises inserting, by the actionable email documents module, the data populating the block into the field, of the metadata, the field corresponding to the field identifier and the field belonging to a database corresponding to the linkage identifier.

2. The one or more processor-accessible storage media as recited in claim 1, wherein the action is selected from a group comprising:
   inserting the data populating the block into a spreadsheet,
   transferring the data populating the block to another email document,
   producing another file with the data populating the block,
   managing one or more workflows,
   validating the data populating the block,
   forwarding at least one of the data populating the at least one block of the email document, and
   uploading contents of the email document based on the metadata.

3. The one or more processor-accessible storage media as recited in claim 1, wherein the actionable email documents module comprises:
   an email document creation module that creates the email document; and
   a collected data insertion effectuator module that inserts the data populating the block into the field of the metadata that corresponds to the field identifier.

4. The one or more processor-accessible storage media as recited in claim 3, wherein:
   the email document creation module comprises part of a database program; and
   the collected data insertion effectuator module comprises a plug-in of the email program.

5. The one or more processor-accessible storage media as recited in claim 1, wherein the actionable email documents module comprises a mapping module that implements a mapping between (i) the block for data population that is associated with the field identifier and (ii) the field of the metadata using the linkage identifier.

6. The one or more processor-accessible storage media as recited in claim 1, wherein the one or more reply email processing options comprise a deadline for arrival of one or more reply email documents, wherein each of the one or more reply email documents comprises the at least one block that is associated with the field identifier, the at least one block populated by data, the data entered by a recipient of the email document into the data collection form.

7. The one or more processor-accessible storage media as recited in claim 1, wherein the one or more reply email processing options further comprise a setting for processing reply email documents from recognized originating addresses.

8. A device comprising:
 at least one processor; and
 one or more media including processor-executable instructions that are capable of being executed by the at least one processor, the processor-executable instructions direct the device to perform acts comprising:
  creating an email document comprising a data collection form and a body, wherein the data collection form is in the body of the email document;
  establishing a mapping between metadata and blocks of the email document, wherein the establishing comprises adding field identifiers to the email document in association with respective blocks of the email document, the blocks capable of accepting data from a recipient of the email document, wherein respective field identifiers correspond to respective fields of the metadata;
  including a linkage identifier with the email document that links the email document to the metadata;
  setting one or more reply email processing options for reply email documents, wherein the one or more reply email processing options comprise a limit to a selectable maximum number of reply email documents eligible for processing;
  transmitting the email document via an email mechanism, wherein the data collection form and blocks are transmitted in the body of the email document;
  setting a deadline for arrival of an email document reply; in response to receiving the email document reply prior to the deadline:
   effectuating an action using received data populating the blocks and responsive to both the field identifiers and the linkage identifier, wherein the action includes:
    inserting the received data populating the blocks within the email document reply into respective fields of the metadata, the fields identified by the field identifiers.

9. The device as recited in claim 8, wherein the establishing action further comprises:
 storing the linkage identifier in association with the metadata at the device.

10. The device as recited in claim 8, wherein the linkage identifier comprises a globally unique identifier (GUID).

11. The device as recited in claim 8, wherein the processor-executable instructions direct the device to perform further actions comprising:
 enabling a user to indicate at least one destination address for the new email document; and
 enabling the user to select one or more fields from the metadata for inclusion in the data collection form.

12. The device as recited in claim 8, wherein the effectuating action comprises:
 effectuating an action selected from a group comprising:
  inserting the data populating the blocks into a spreadsheet,
  transferring the data populating the blocks to another email document,
  producing another file comprising the data populating the blocks,
  managing one or more workflows,
  validating the data populating the blocks,
  forwarding at least a portion of the contents of the email document using the data populating the blocks, and
  uploading contents of the email document based on the metadata.

13. The device as recited in claim 8, wherein the effectuating action comprises:
 receiving a new mail event notification upon receipt of the reply email document;
 accessing a linkage table to extract a database using the linkage identifier of the reply email document; and
 ascertaining the metadata from a table of the extracted database.

14. The device as recited in claim 8, wherein the metadata comprises at least one of (i) a schema, (ii) a data source, or (iii) one or more instances of a workflow state.

15. The device as recited in claim 14, wherein the data source comprises at least a portion of a database.

16. A method comprising:
 adding blocks that are capable of accepting data to a body of an email document;
 adding field identifiers in association with the blocks to the body of the email document, the field identifiers corresponding to respective fields of metadata;
 adding a linkage identifier to the body of the email document, the linkage identifier linking the email document to the metadata;
 setting one or more reply email processing options for reply email documents, wherein the one or more reply email processing options comprise a limit to a selectable maximum number of reply email documents eligible for processing;
 transmitting the email document toward a destination email address via an email mechanism, the blocks being transmitted in the body of the email document;
 rendering the blocks for data population when rendering the email document;
 populating at least one of the blocks with data;
 receiving a reply email document via the email mechanism, the reply email document comprising the body, the body comprising the linkage identifier and the field identifiers associated with the blocks, the blocks being populated with data; and
 effectuating an action using the data populating the blocks in the body of the received reply email document responsive to both the linkage identifier and the field identifiers of the reply email document, the effectuating comprising inserting the data into respective fields of the metadata that correspond to respective field identifiers that are respectively associated with the blocks.

17. The method as recited in claim 16, further comprising:
 enabling a user to select the fields of the metadata, each selected field being represented in the email document by a corresponding included field identifier and an associated added block, and wherein the blocks in the reply email document are populated by data entered by the user.

18. The method as recited in claim 16, the method further comprising:

appending current data values from the fields of the metadata to the body of the email document.

19. The method as recited in claim 16, further comprising:
appending a hints section to the email document, the hints section indicating an expected content format of data that is to populate one or more of the blocks, or an expected content and format of the expected content.

20. The method as recited in claim 16, wherein the effectuating comprises:
effectuating an action selected from a group comprising: inserting the data populating the blocks into a spreadsheet, transferring the data populating the blocks to another email document, producing another file with the data populating the blocks, managing one or more workflows, validating the data populating the blocks, forwarding contents of the email document using the data populating the blocks, and uploading contents of the email document based on the metadata.

21. The method as recited in claim 16, wherein the effectuating comprises:
ascertaining the metadata using the linkage identifier of the reply email document;
determining the fields of the metadata using the field identifiers of the reply email document; and
inserting the data populating the blocks of the reply email document into the fields of the metadata based on the determining.

22. One or more processor-accessible storage media comprising processor-executable instructions that, when executed, cause a computing device to perform acts comprising:
receiving input by a database program, the input including a database table, a field within the database table, a recipient, an operation associated with the email, the operation indicating an insertion or an update, and a type of data collection;
in response to the input, the database program performs the following:
in response to determining the type of data collection corresponds to email, the database program creates an email, the email comprising a table identifier associated with the database table and a field identifier associated with the field within the database table;
sends the email to the recipient;
processes a reply email from the recipient in accordance with the email processing option, the reply email comprising the field identifier, the table identifier and received data, the processing including:
in response to determining the operation associated with the email indicates an insert, inserting the received data into the field of the database; and
in response to determining the operation associated with the email indicates an update, updating data associated with the field of the database with the received data.

* * * * *